(12) United States Patent
Nakatsu et al.

(10) Patent No.: US 7,520,367 B2
(45) Date of Patent: Apr. 21, 2009

(54) VEHICLE STEERING APPARATUS

(75) Inventors: Masatoshi Nakatsu, Toyota (JP); Hiroshi Kawakami, Nishikamo-gun (JP); Norikazu Hayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 288 days.

(21) Appl. No.: 11/094,451

(22) Filed: Mar. 31, 2005

(65) Prior Publication Data

US 2005/0230179 A1  Oct. 20, 2005

(30) Foreign Application Priority Data

Apr. 16, 2004 (JP) .............................. 2004-121296

(51) Int. Cl.
*B62D 5/04* (2006.01)
(52) U.S. Cl. .................. 180/444; 180/446; 180/402; 180/408; 180/443
(58) Field of Classification Search ............... 180/444, 180/446, 402, 408, 443
See application file for complete search history.

(56) References Cited

U.S. PATENT DOCUMENTS

| 4,779,693 | A * | 10/1988 | Takahashi et al. ........... 180/412 |
| 5,010,971 | A * | 4/1991 | Hamada et al. ............. 180/412 |
| 6,176,341 | B1 * | 1/2001 | Ansari ........................ 180/402 |
| 6,546,323 | B2 * | 4/2003 | Deguchi et al. ............... 701/41 |
| 6,548,969 | B2 * | 4/2003 | Ewbank et al. ............... 318/34 |
| 6,549,835 | B2 * | 4/2003 | Deguchi et al. ............... 701/41 |
| 6,991,061 | B2 * | 1/2006 | Laurent ....................... 180/402 |
| 7,014,008 | B2 * | 3/2006 | Furumi et al. ............... 180/443 |
| 2006/0162991 | A1 * | 7/2006 | Kuehnhoefer et al. ....... 180/444 |
| 2006/0278467 | A1 * | 12/2006 | Endo et al. .................. 180/446 |

FOREIGN PATENT DOCUMENTS

| DE | 29 52 087 | 7/1981 |
| DE | 197 50 585 | 6/1999 |
| JP | A-62-12461 | 1/1987 |
| JP | A-2002-160649 | 6/2002 |
| JP | A 2002-160649 | 6/2002 |
| JP | A 2003-112650 | 4/2003 |
| WO | WO 01/25071 | 4/2001 |

* cited by examiner

*Primary Examiner*—Paul N Dickson
*Assistant Examiner*—Marlon A Arce
(74) *Attorney, Agent, or Firm*—Oliff & Berridge, PLC

(57) ABSTRACT

A steering handle 11 is connected to a front-left wheel FW1 via first and second steering shafts 12 and 13, a pinion gear 14 and a rack bar 31. The pinion gear 14 is connected to a front-right wheel FW2 via third to fifth steering shafts 15, 16 and 23, a pinion gear 24 and a rack bar 34. A first differential gear mechanism 40 is interposed between the first and second steering shafts 12 and 13, whereby the rotation of an electric motor 49 realizes the difference in the rotation between the input shaft and the output shaft of the first differential gear mechanism 40. A second differential gear mechanism 50 is interposed between the third and fourth steering shafts 15 and 16, whereby the rotation of an electric motor 59 realizes the difference in the rotation between the input shaft and the output shaft of the second differential gear mechanism 50. Therefore, the pair of left and right steering wheels FW1, FW2 are steered independently, thereby enhancing maneuverability of a vehicle.

10 Claims, 2 Drawing Sheets

VEHICLE STEERING APPARATUS

BACKGROUND OF THE INVENTION

1. Field of the Invention

The present invention relates to a vehicle steering apparatus wherein a steering handle is mechanically connected to a pair of left and right steering wheels for steering the pair of left and right steering wheels according to the steering operation of the steering handle.

2. Description of the Prior Arts

There has conventionally been well-known a vehicle steering apparatus as disclosed in, for example Japanese Unexamined Patent Application No. 2002-160649, wherein a differential gear mechanism that can increase or decrease a rotation angle of an input shaft and output the resultant to an output shaft is interposed between a pair of left and right steering wheels and a steering handle so as to be capable of performing auxiliary steering to the steering wheels independent of the revolution of the steering handle.

However, it is impossible to independently perform an auxiliary steering to the pair of left and right steering wheels in the above-mentioned conventional apparatus.

SUMMARY OF THE INVENTION

The present invention is accomplished in view of the above-mentioned problem and aims to provide a vehicle steering apparatus that can independently steer a pair of left and right steering wheels to improve maneuverability of a vehicle.

In order to attain the aforesaid object, the feature of the present invention is that, in a vehicle steering apparatus wherein a steering handle is mechanically connected to a pair of left and right steering wheels for steering the steering wheels according to the steering operation of the steering handle, at least a first differential gear mechanism that can output a rotation angle of an input shaft to an output shaft as increased or decreased is arranged in a portion between the steering handle and one of the steering wheels, and at least a second differential gear mechanism that can output a rotation angle of an input shaft to an output shaft as increased or decreased is arranged in a portion between the steering handle and the other of the steering wheels which portion does not include the portion between the steering handle and the one of the steering wheels. In this case, the first differential gear mechanism and the second differential gear mechanism may respectively include an electric actuator for increasing and decreasing the rotation angle of the input shaft to output the resultant to the output shaft, and control means for drive-controlling the electric actuator may further be provided.

Further, in the configuration in the feature of the present invention, the first differential gear mechanism and the second differential gear mechanism may be connected in series to the steering handle in this order and the pair of left and right steering wheels may be respectively connected to each output shaft of the first differential gear mechanism and the second differential gear mechanism, for example. Moreover, the rotational motion of the output shaft of the first differential gear mechanism may be converted into a linear motion by a first motion converting mechanism to be outputted to the one of the steering wheels, while the rotational motion of the output shaft of the second differential gear mechanism may be converted into a linear motion by a second motion converting mechanism to be outputted to the other steering wheel.

Further, in the configuration in the feature of the present invention, the first differential gear mechanism and the second differential gear mechanism may be arranged in parallel, wherein each input shaft of the first differential gear mechanism and the second differential gear mechanism may be connected to the steering handle and each output shaft of the first differential gear mechanism and the second differential gear mechanism may be connected to the pair of left and right steering wheels respectively. Moreover, the rotational motion of the output shaft of the first differential gear mechanism may be converted into a linear motion by a first motion converting mechanism to be outputted to the one of the steering wheels, while the rotational motion of the output shaft of the second differential gear mechanism may be converted into a linear motion by a second motion converting mechanism to be outputted to the other steering wheel.

In the present invention having the aforesaid configuration, the rotation angle of each of the input shafts of the first differential gear mechanism and the second differential gear mechanism is independently increased or decreased to be outputted to the output shaft, thereby making it possible to independently steer the pair of left and right steering wheels. Therefore, the maneuverability of the vehicle can be improved. Further, in the configuration wherein the first differential gear mechanism and the second differential gear mechanism are connected in series, the steering angle of the pair of left and right steering wheels can be varied independent of the turning of the steering handle even if a trouble occurs on the second differential gear mechanism positioned at the side remote from the steering handle, whereby an auxiliary steering function for steering the steering wheels so as to be independent of the turning of the steering handle can be ensured.

DESCRIPTION OF THE PREFERRED EMBODIMENT a. First Embodiment

Figure 1:
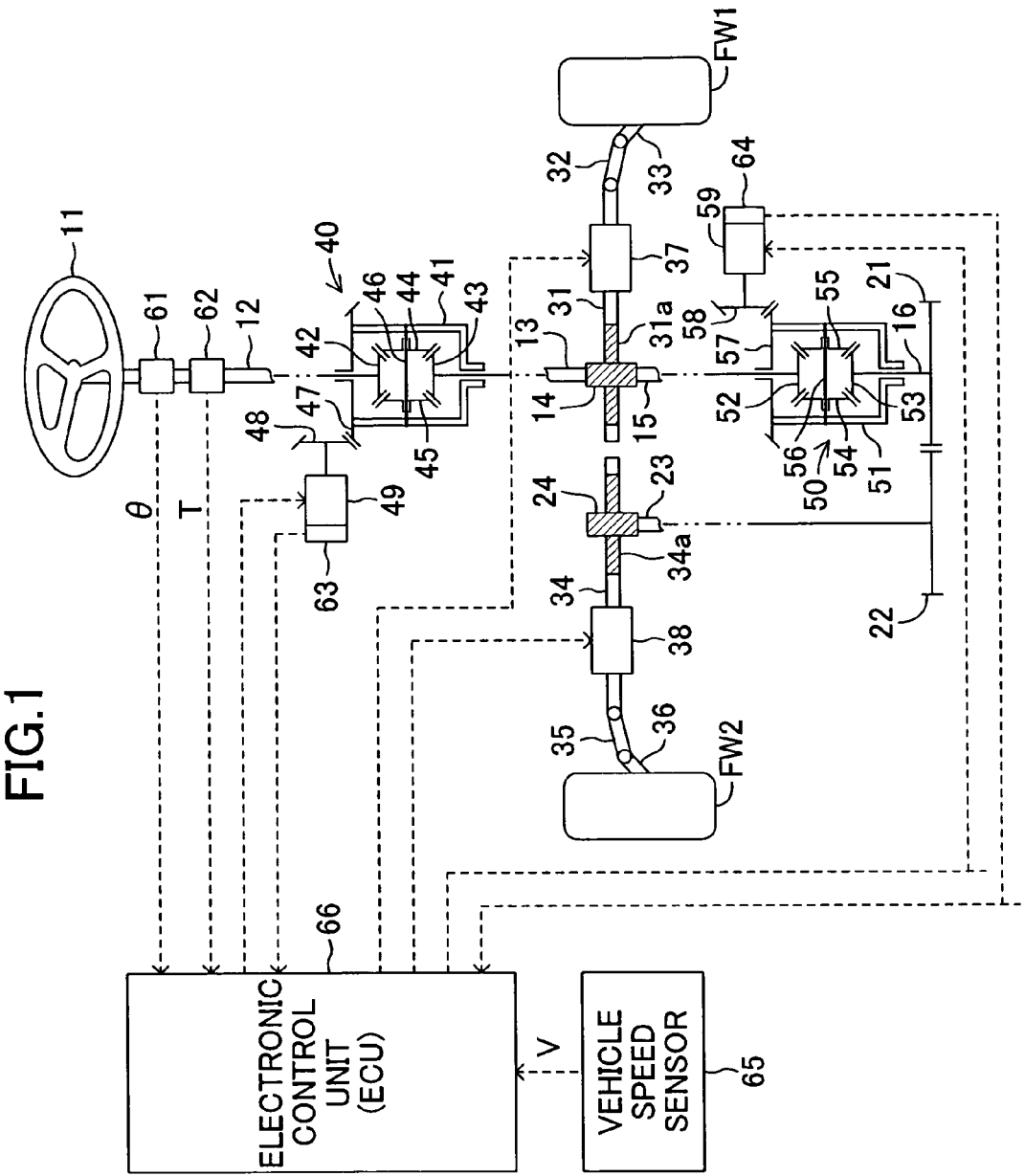
FIG. 1 is an general schematic view of a vehicle steering apparatus according to a first embodiment of the present invention.

A first embodiment of the present invention will be explained hereinafter with reference to a drawing. FIG. 1 is a general schematic view of a vehicle steering apparatus according to the first embodiment of the present invention.

This vehicle steering apparatus is provided with a first steering shaft 12, one end of which is connected to a steering handle 11 so as to integrally rotate. The other end of the first steering shaft 12 is connected to one end of a second steering shaft 13 via a first differential gear mechanism 40. A pinion gear 14 is connected to the other end of the second steering shaft 13 so as to integrally rotate around the axis. Connected to the pinion gear 14 is one end of a third steering shaft 15 so as to integrally rotate around the axis. The other end of the third steering shaft 15 is connected to one end of a fourth steering shaft 16 via a second differential gear mechanism 50. A spur gear 21 is connected to the other end of the fourth steering shaft 16 so as to integrally rotate around the axis. A spur gear 22 having gear teeth same in number as those of the spur gear 21 is engaged with the spur gear 21. One end of a fifth steering shaft 23 is connected to the spur gear 22 so as to integrally rotate around the axis. A pinion gear 24 is connected to the other end of the fifth steering shaft 23 so as to integrally rotate around the axis.

The pinion gear 14 is engaged with rack teeth 31a formed at a rack bar 31 supported to a vehicle body so as to be able to displace to the right or to the left in the axial direction, thereby composing a rack and pinion mechanism. A front-left wheel FW1 serving as a steering wheel is steerably connected at the left end (right side in the figure) of the rack bar 31 through a tie rod 32 and a knuckle arm 33. The front-left wheel FW1 is steered to the right or to the left in accordance with the displacement of the rack bar 31 in the axial direction with the rotation of the second steering shaft 13 around the axis. The pinion gear 24 is engaged with rack teeth 34a formed at a rack bar 34 supported to a vehicle body so as to be able to displace to the right or to the left in the axial direction, thereby composing a rack and pinion mechanism. A front-right wheel FW2 serving as a steering wheel is steerably connected at the right end (left side in the figure) of the rack bar 34 through a tie rod 35 and a knuckle arm 36. The front-right wheel FW2 is steered to the right or to the left in accordance with the displacement of the rack bar 34 in the axial direction with the rotation of the fifth steering shaft 23 around the axis.

The first differential gear mechanism 40 has the other end of the first steering shaft 12 defined as an input shaft and the one end of the second steering shaft 13 defined as an output shaft. It can increase and decrease the rotation angle of the input shaft and output the resultant to the output shaft. The first differential gear mechanism 40 has a housing 41 supported at the vehicle body so as to be rotated around the axis. Housed in the housing 41 are first to fourth gears 42 to 45 composed of a bevel gear respectively. The first gear 42 is connected to the other end of the first steering shaft 12 so as to integrally rotate around the axis, while the second gear 43 is connected to the one end of the second steering shaft 13 so as to integrally rotate around the axis. The third and fourth gears 44 and 45 are rotatably supported by a support shaft 46 extending in the direction orthogonal to the axial direction of the first and the second steering shafts 12 and 13 and fixed to the housing 41, wherein they are engaged with the first and second gears 42 and 43 respectively.

Fixed to the housing 41 is a fifth gear 47 composed of a bevel gear through which the first steering shaft 12 is penetrated so as to rotate around the axis. This fifth gear 47 is engaged with a sixth gear 48 composed of a bevel gear. The sixth gear 48 is connected on the rotation axis of an electric motor 49 so as to integrally rotate around the axis. This electric motor 49 composes an electric actuator for causing the first differential gear mechanism 40 to perform a differential operation. The rotation of the electric motor 49 is outputted to the sixth gear 48 via a built-in deceleration mechanism to thereby rotate the fifth gear 47 and the housing 41 around the axis of the first and second steering shafts 12 and 13.

The second differential mechanism 50 has the other end of the third steering shaft 15 defined as an input shaft and the one end of the fourth steering shaft 16 defined as the output shaft, wherein it can increase and decrease the rotation angle of the input shaft and output the resultant to the output shaft. The second differential gear mechanism 50 is composed of a housing 51, first to fourth gears 52 to 55, support shaft 56, fifth and sixth gears 57 and 58 and electric motor 59, each of which are the same as the housing 41, first to fourth gears 42 to 45, support shaft 46, fifth and sixth gears 47 and 48 and electric motor 49 of the first differential gear mechanism 40.

Electric motors 37 and 38 serving as a steering-assist actuator are installed to the rack bars 31 and 34. These electric motors 37 and 38 linearly drive the rack bars 31 and 32 in the axial direction through a built-in screw feeding mechanism during their rotations.

Further, the vehicle steering apparatus also has an electric control circuit composed of a steering angle sensor 61, steering torque sensor 62, rotation angle sensors 63 and 64, vehicle speed sensor 65 and electronic control unit 66 (hereinafter referred to as ECU 66). The steering angle sensor 61 is attached to the first steering shaft 12 for detecting a steering angle $\theta$ of the steering handle 11. This steering angle $\theta$ represents the turning direction of the steering handle 11 from its neutral position according to its sign of plus or minus and represents the magnitude of the turning angle of the steering handle by its absolute value. The steering torque sensor 62 is attached to the first steering shaft 12 for detecting a steering torque T applied to the steering handle 11. The steering torque T represents the direction of the torque by its sign of plus or minus and represents the magnitude of the torque by its absolute value. The rotation angle sensors 63 and 64 are attached to the electric motors 49 and 59 respectively for detecting the rotation angles $\theta m1$ and $\theta m2$ of the electric motors 49 and 59. The rotation angles $\theta m1$ and $\theta m2$ represent the rotating direction of the electric motors 49 and 59 from the reference position by its sign of plus or minus and represent the magnitude of the rotation angles of the electric motors 49 and 59 by its absolute value. The vehicle speed sensor 65 detects a vehicle speed V.

The ECU 66 has a microcomputer composed of CPU, ROM, RAM, or the like and also has a driving circuit for drive-controlling the electric motors 37, 38, 49 and 59. The ECU 66 inputs various detection signals from various sensors 61 to 65 to control the rotation of each of the electric motors 37, 38, 49 and 59.

Subsequently explained is an operation of the first embodiment having the aforesaid configuration. When a driver operates to turn the steering handle 11, the turn of the steering handle 11 is transmitted to the pinion gear 14 through the first steering shaft 12, first differential gear mechanism 40 and the second steering shaft 13, whereupon the pinion gear 14 displaces the rack bar 31 in the axial direction by an amount corresponding to the turning angle of the steering handle 11. The displacement of the rack bar 31 in the axial direction steers the front-left wheel FW1. Further, the rotation of the pinion gear 14 is also transmitted to the pinion gear 24 through the third steering shaft 15, second differential gear mechanism 50, fourth steering shaft 16, spur gears 21 and 22 and fifth steering shaft 23, whereupon the pinion gear 24 displaces the rack bar 34 in the axial direction by the amount corresponding to the turning angle of the steering handle 11. The displacement of the rack bar 34 in the axial direction steers the front-right wheel FW2. According to this, the front-left wheel FW1 and front-right wheel FW2 are steered to the left and to the right according to the turning of the steering handle 11.

On the other hand, the ECU 66 inputs detection signals from various sensors 61 to 65 to control the rotation of each of the electric motors 37, 38, 49 and 59 by the program processing during when the front-left wheel FW1 and the front-right wheel FW2 are steered. For example, the ECU 66 inputs the handle steering angle $\theta$, the vehicle speed V and the rotation angles $\theta m1$ and $\theta m2$ for independently performing an auxiliary steering to the front-left wheel FW1 and front-right wheel FW2 respectively according to the handle steering angle $\theta$ and the vehicle speed V. Specifically, the ECU 66 calculates positive small auxiliary steering angles $\theta 0$ for the front-left and front-right wheels FW1 and FW2 that increase with the increase of the absolute value $|\theta|$ of the handle steering angle $\theta$ and decrease with the increase of the vehicle speed V, respectively.

Then, if the handle steering angle $\theta$ represents the leftward steering of the steering handle 11, it adds a positive extremely small value $\theta 1$ ($0<\theta 1<\theta 0$) that increases according to the increase in the absolute value $|\theta|$ of the handle steering angle $\theta$ to the auxiliary steering angle $\theta 0$ to thereby calculate the front-left wheel auxiliary steering angle $\theta 0+\theta 1$, while it subtracts a positive extremely small value $\theta 2$ ($0<\theta 2<\theta 0$) that increases according to the increase in the absolute value $|\theta|$ of the handle steering angle $\theta$ from the auxiliary steering angle $\theta 0$ to thereby calculate a front-right wheel auxiliary steering angle θ0−θ2. The signs of plus or minus of these auxiliary steering angles θ0+θ1 and θ0−θ2 for front-left and front-right wheels are matched with the sign of plus or minus of the handle steering angle θ to obtain final target auxiliary steering angles θa* and θb* of the front-left and front-right wheels FW1 and FW2. On the other hand, if the handle steering angle θ represents the rightward steering of the steering handle 11, it subtracts the positive extremely small value θ2 from the auxiliary steering angle θ0 to thereby calculate the front-left wheel auxiliary steering angle θ0−θ2, while it adds the positive extremely small value θ2 to the auxiliary steering angle θ0 to thereby calculate a front-right wheel auxiliary steering angle θ0+θ2. The signs of plus or minus of these auxiliary steering angles θ0−θ2 and θ0+θ1 for front-left and front-right wheels are matched with the sign of plus or minus of the handle steering angle θ to obtain final target auxiliary steering angles θa* and θb* of the front-left and front-right wheels FW1 and FW2.

Then, the ECU 66 converts the target auxiliary steering angle θa* for the front-left wheel FW1 into a value corresponding to the rotation angle of the electric motor 49 and controls the rotation of the electric motor 49 such that the inputted rotation angle θm1 of the electric motor 49 becomes equal to the converted value. The rotation of the electric motor 49 is transmitted to the housing 41 through the sixth gear 48 and the fifth gear 47 of the first differential gear mechanism 40, whereby the housing 41 rotates by an angle equal to the converted value of the target auxiliary steering angle θa*. In this case, the first differential gear mechanism 40 increases or decreases the rotation angle of the second steering shaft 13, that is its output shaft, by the converted value of the target auxiliary steering angle θa* with respect to the rotation angle of the first steering shaft 12, that is its input shaft, whereby the front-left wheel FW1 is steered at the angle that is increased or decreased by the target auxiliary steering angle θa* for the front-left wheel FW1 from the steering angle corresponding to the steering angle θ of the steering handle 11.

Further, the ECU 66 subtracts the target auxiliary steering angle θa* for the front-left wheel FW1 from the target auxiliary steering angle θb* for the front-right wheel FW2 and converts the subtracted value of θb*−θa* into a value corresponding to the rotation angle of the electric motor 59, and controls the rotation of the electric motor 59 such that the inputted rotation angle θm2 of the electric motor 59 becomes equal to the converted value. The rotation of the electric motor 59 is transmitted to the housing 51 through the sixth gear 58 and the fifth gear 57, whereby the housing 51 rotates by an angle equal to the converted value of the subtracted value of θb*−θa*. In this case, the second differential gear mechanism 50 increases or decreases the rotation angle of the fourth steering shaft 16, that is its output shaft, by the converted value of the subtracted value of θb*−θa* with respect to the rotation angle of the third steering shaft 15, that is its input shaft, whereby the front-right wheel FW2 is steered at the angle that is increased or decreased by the subtracted value of θb*−θa* from the steering angle of the front-left wheel FW1. According to this, the front-right wheel FW2 is steered at the angle that is increased or decreased by the target auxiliary steering angle θb* from the steering angle corresponding to the steering angle θ of the steering handle 11.

As a result, the front-left and front-right wheels FW1 and FW2 are steered at the steering angle that is shifted by the target auxiliary steering angles θa* and θb* for the front-left and front-right wheels FW1 and FW2, which increase with the increase in the absolute value |θ| of the handle steering angle θ and increase with the decrease in the vehicle speed V, with respect to the steering angle corresponding to the handle steering angle θ. Moreover, the target auxiliary steering angles θa* and θb* for the front-left and front-right wheels FW1 and FW2 are set such that the wheels at the inner side of the turning direction of the vehicle are steered more greatly inward than the wheels at the outer side of the turning direction, thereby providing satisfactory turning performance. It should be noted that the calculation examples of the target auxiliary steering angles θa* and θb* for the front-left and front-right wheels FW1 and FW2 are given solely for the purpose of illustration. Any method can be applied so long as it is a method for calculating the target auxiliary steering angles θa* and θb* for the front-left and front-right wheels FW1 and FW2 to obtain values different from each other.

Further, the ECU 66 inputs the steering torque T and the vehicle speed V to assist-control the steering operation of the steering handle 11 according to the steering torque T and the vehicle speed V. Specifically, the ECU 66 calculates an assist torque that increases with the increase in the absolute value |T| of the steering torque T and decreases with the increase in the vehicle speed V. Then, it controls the rotations of the electric motors 37 and 38 such that the electric motors 37 and 38 generate a driving torque corresponding to the assist torque. The electric motors 37 and 38 drive the rack bars 31 and 34 in the axial direction via the built-in screw feeding mechanism. According to this, if the driver is going to steer the front-left and front-right wheels FW1 and FW2 by operating to turn the steering handle 11, the electric motors 37 and 38 assist the turning operation of the steering handle 11 by the driver.

As understood from the above-mentioned explanation about the operation, according to the first embodiment, the rotation angles of the input shafts at the first differential gear mechanism 40 and the second differential gear mechanism 50 are outputted to the output shaft as independently increased or decreased, thereby making it possible to independently execute the auxiliary steering to the front-left and front-right wheels FW1 and FW2, and hence, maneuverability of the vehicle can be enhanced. Moreover, the first differential gear mechanism 40 and the second differential gear mechanism 50 are connected in series, whereby the steering angles of the front-left and front-right wheels FW1 and FW2 can be steered so as to be independent of the turning of the steering handle by operating only the first differential gear mechanism 40 even if some trouble occurs on the second differential gear mechanism 50. Accordingly, even if some trouble occurs on the second differential gear mechanism 50, the auxiliary steering function for steering the front-left and front-right wheels FW1 and FW2 so as to be independent of the turning of the steering handle 11 can be ensured.

b. Second Embodiment

Figure 2:
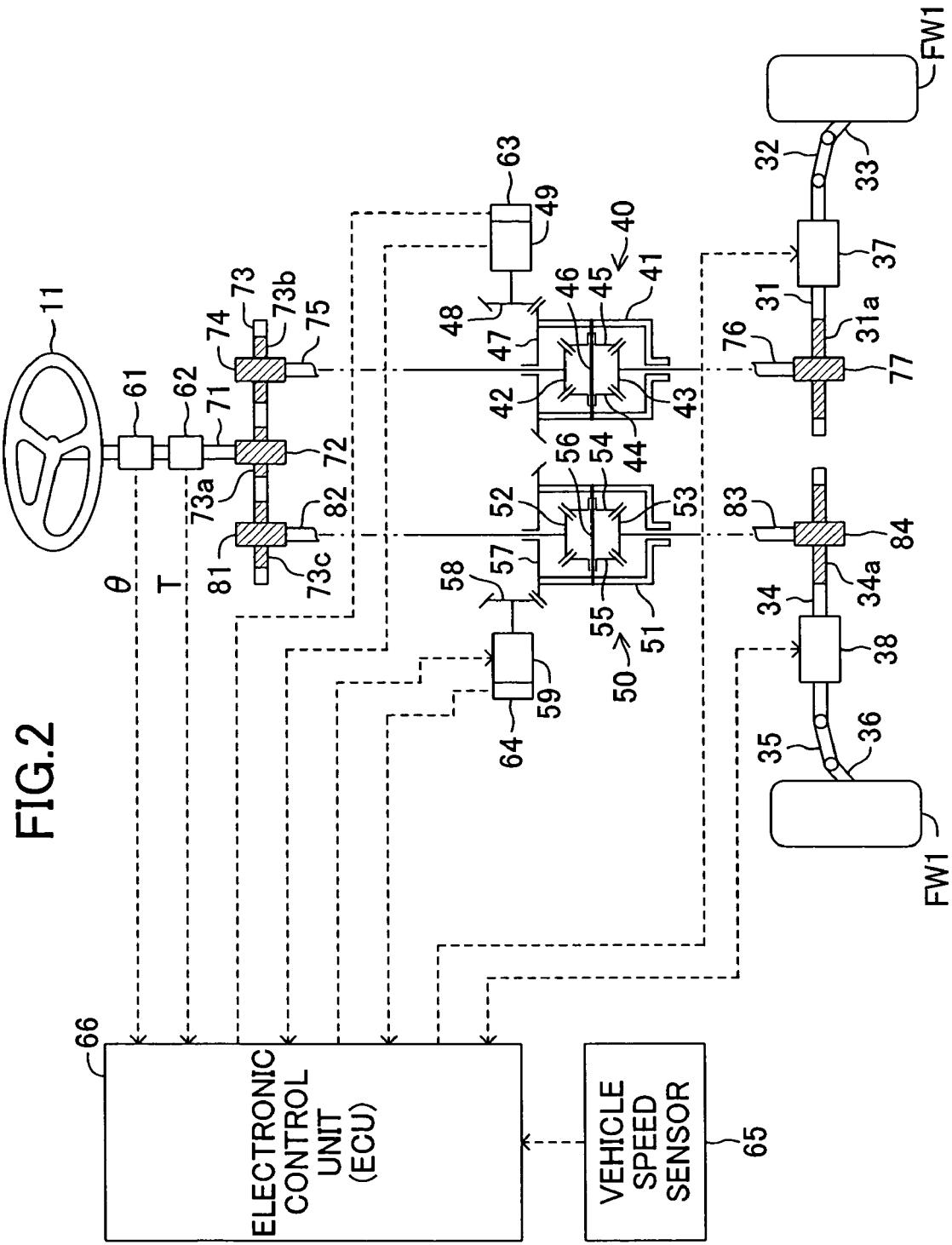
FIG. 2 is general schematic view of a vehicle steering apparatus according to a second embodiment of the present invention.

Subsequently, a vehicle steering apparatus according to the second embodiment will be explained with reference to FIG. 2. The vehicle steering apparatus in the second embodiment has a configuration wherein the first and second differential gear mechanisms 40 and 50 in the first embodiment are connected in parallel.

The vehicle steering apparatus has a first steering shaft 71, one end of which is connected to the steering handle 11 so as to integrally rotate. A pinion gear 72 is connected to the other end of the first steering shaft 71 so as to integrally rotate in the axial direction. The pinion gear 72 is engaged with rack teeth 73a formed on a rack bar 73 supported at the vehicle body so as to be able to displace to the right or to the left in the axial direction, thereby composing a rack and pinion mechanism. Rack teeth 73b and 73c are also formed on the rack bar 73, wherein a pinion gear 74 is engaged with the rack teeth 73b. Connected to this pinion gear 74 is one end of a second steering shaft 75 so as to integrally rotate in the axial direction. The other end of the second steering shaft 75 is connected to one end of a third steering shaft 76 via the first differential gear mechanism 40. A pinion gear 77 is connected to the other end of the third steering shaft 76 so as to integrally rotate in the axial direction. This pinion gear 77 is engaged with rack teeth 31a of a rack bar 31 that is similar to the one for the front-left wheel FW1 in the first embodiment.

Further, a pinion gear 81 is engaged with the rack teeth 73c of the rack bar 73. Connected to this pinion gear 81 is one end of a fourth steering shaft 82 so as to integrally rotate in the axial direction. The other end of the fourth steering shaft 82 is connected to one end of a fifth steering shaft 83 via the second differential gear mechanism 50. A pinion gear 84 is connected to the other end of the fifth steering shaft 83 so as to integrally rotate in the axial direction. This pinion gear 84 is engaged with rack teeth 34a of a rack bar 34 that is similar to the one for the front-right wheel FW2 in the first embodiment. The other configurations are the same as those in the first embodiment, so that the same numerals are given to omit the explanation thereof.

Subsequently, the operation of the second embodiment having the aforesaid configuration will be explained. When a driver operates to turn the steering handle 11, the turning of the steering handle 11 is transmitted to the pinion gear 77 through the first steering shaft 71, pinion gear 72, rack bar 73, pinion gear 74, second steering shaft 75, first differential gear mechanism 40 and third steering shaft 76, whereupon the pinion gear 77 displaces the rack bar 31 in the axial direction by the amount corresponding to the turning angle of the steering handle 11. The displacement of the rack bar 31 in the axial direction steers the front-left wheel FW1. Further, the turning of the steering handle 11 is transmitted to the pinion gear 84 through the first steering shaft 71, pinion gear 72, rack bar 73, pinion gear 81, fourth steering shaft 82, second differential gear mechanism 50 and fifth steering shaft 83, whereupon the pinion gear 84 displaces the rack bar 34 in the axial direction by the amount corresponding to the turning angle of the steering handle 11. The displacement of the rack bar 34 in the axial direction steers the front-right wheel FW2. According to this, the front-left and front-right wheels FW1 and FW2 are steered to the left or to the right in accordance with the turning of the steering handle 11.

On the other hand, the ECU 66 inputs detection signals from various sensors 61 to 65 by a program processing during when the front-left and front-right wheels FW1 and FW2 are steered, thereby controlling the rotations of the electric motors 37, 38, 49 and 59. Although the control of rotations of the electric motors 37, 38, 49 and 59 is also generally the same as that in the first embodiment, it is slightly different from the first embodiment in the process for converting the target auxiliary steering angles θa* and θb* for the front-left and front-right wheels FW1 and FW2 into a value corresponding to the rotation angles of the electric motors 49 and 59, since the first and second differential gears 40 and 50 are connected in parallel.

Specifically, it is the same as the first embodiment in that the target auxiliary steering angle θa* for the front-left wheel FW1 is converted into the value corresponding to the rotation angle of the electric motor 49 to control the rotation of the electric motor 49 such that the rotation angle θm1 of the electric motor 49 becomes equal to the converted value. However, it is unnecessary to consider the influence of the first differential gear mechanism 40, as in the first embodiment, in the control of the rotation of the electric motor 59. Therefore, the target auxiliary steering angle θb* for the front-right wheel FW2 is simply converted into the value corresponding to the rotation angle of the electric motor 59 for controlling the rotation of the electric motor 59 such that the rotation angle θm2 of the electric motor 59 becomes equal to the converted value. According to these, the front-left and front-right wheels FW1 and FW2 are controlled to be steered like the first embodiment, thereby providing satisfactory turning performance of a vehicle. It should be noted that the control of the steering assist electric motors 37 and 38 is entirely same as the case of the first embodiment.

As understood from the aforesaid explanation about the operation, according to the second embodiment too, the rotation angles of the input shafts at the first differential gear mechanism 40 and the second differential gear mechanism 50 are outputted to the output shaft as independently increased or decreased, whereby the front-left and front-right wheels FW1 and FW2 can independently be steered, thereby being capable of enhancing maneuverability of a vehicle.

Further, the present invention is not limited to the first and second embodiments, but various modifications are possible within the scope of the present invention.

For example, although the applied steering handle 11 is the one that can be turned in the aforesaid embodiments, the present invention is also applied to a vehicle steering apparatus for steering the steering wheels by a linear operation such as a steering handle that is not turned, e.g., a joy stick. It should be noted that, in this case, the linear operation of the steering handle 11 is converted into a rotational motion at the upstream of the first and second differential gear mechanisms 40 and 50 since it is necessary to rotate the input shafts of the first and second differential gear mechanisms 40 and 50.

What is claimed is:

1. A vehicle steering apparatus wherein a steering handle is mechanically connected to a pair of left and right steering wheels for steering the steering wheels according to a steering operation of the steering handle, the vehicle steering apparatus comprising:

a first differential gear mechanism that can output a rotation angle of an input shaft to an output shaft as increased or decreased, the first differential gear mechanism being arranged in a portion between the steering handle and one of the steering wheels; and a second differential gear mechanism that can output a rotation angle of an input shaft to an output shaft as increased or decreased, the second differential gear mechanism being arranged in a portion between the steering handle and the other of the steering wheels which portion does not include the portion between the steering handle and the one of the steering wheels;

wherein the rotation angle outputted by the first differential gear mechanism is independent of the rotation angle outputted by the second differential gear mechanism, the first differential gear mechanism and the second differential gear mechanism are connected in mechanical series to the steering handle in this order, and the pair of left and right steering wheels are connected to the respective output shafts of the first differential gear mechanism and the second differential gear mechanism.

2. A vehicle steering apparatus according to claim 1, wherein a rotational motion of the output shaft of the first differential gear mechanism is converted into a linear motion by a first motion converting mechanism to be outputted to one of the steering wheels, and a rotational motion of the output shaft of the second differential gear mechanism is converted into a linear motion by a second motion converting mechanism to be outputted to the other of the steering wheels.

3. A vehicle steering apparatus according to claim 1, wherein the first differential gear mechanism and the second differential gear mechanism respectively include an electric actuator for outputting the rotation angle of the input shaft to the output shaft as increased or decreased, and the vehicle steering apparatus further includes control means for drive-controlling the electric actuator.

4. A vehicle steering apparatus wherein a steering handle is mechanically connected to a pair of left and right steering wheels for steering the steering wheels according to a steering operation of the steering handle, the vehicle steering apparatus comprising:
- a first differential gear mechanism that can output a rotation angle of an input shaft to an output shaft as increased or decreased, the first differential gear mechanism being arranged in a portion between the steering handle and one of the steering wheels; and
- a second differential gear mechanism that can output a rotation angle of an input shaft to an output shaft as increased or decreased, the second differential gear mechanism being arranged in a portion between the steering handle and the other of the steering wheels, which portion does not include the portion of the first differential gear mechanism between the steering handle and the one of the steering wheels,
- wherein the first and second differential gear mechanisms each have a housing that is rotatably supported at a vehicle body and each housing houses first to fourth bevel gears, wherein the first bevel gear is rotatably supported at the housing and is connected to an input shaft so as to integrally rotate with an input shaft, the second bevel gear is rotatably supported at the housing and is connected to the output shaft so as to integrally rotate with the output shaft, and the third and fourth bevel gears are rotatably supported by support shafts fixed to the housing and are engaged with the first and second bevel gears, respectively,
- wherein the rotation angle outputted by the first differential gear mechanism is independent of the rotation angle outputted by the second differential gear mechanism,
- the first differential gear mechanism and the second differential gear mechanism are connected in mechanical series to the steering handle in this order, and
- the pair of left and right steering wheels are connected to the respective output shafts of the first differential gear mechanism and the second differential gear mechanism.

5. A vehicle steering apparatus according to claim 4, wherein
- a rotational motion of the output shaft of the first differential gear mechanism is converted into a linear motion by a first motion converting mechanism to be outputted to one of the steering wheels, and
- a rotational motion of the output shaft of the second differential gear mechanism is converted into a linear motion by a second motion converting mechanism to be outputted to the other one of the steering wheels.

6. A vehicle steering apparatus according to claim 4, wherein
- the first differential gear mechanism and the second differential gear mechanism respectively include an electric actuator for outputting the rotation angle of the input shaft to the output shaft as increased or decreased, and
- the vehicle steering operation further including control means for drive-controlling the electric actuator.

7. A vehicle steering apparatus wherein a steering handle is mechanically connected to a pair of left and right steering wheels for steering the steering wheels according to a steering operation of the steering handle, the vehicle steering apparatus comprising:
- a first differential gear mechanism that can output a rotation angle of an input shaft to an output shaft as increased or decreased, the first differential gear mechanism being arranged in a position between the steering handle and one of the steering wheels; and
- a second differential gear mechanism that can output a rotation angle of an input shaft to an output shaft as increased or decreased, the second differential gear mechanism being arranged in a portion between the steering handle and the other of the steering wheels,
- wherein the input shaft of the first differential gear mechanism is mechanically connected to the steering handle to input a rotational motion from the steering handle, and the input shaft of the second differential gear mechanism is mechanically connected to the output shaft of the first differential gear mechanism to input a rotational motion from the output shaft of the first differential gear mechanism,
- wherein the rotation angle outputted by the first differential gear mechanism is independent of the rotation angle outputted by the second differential gear mechanism.

8. A vehicle steering apparatus according to claim 7, wherein
- the pair of left and right steering wheels are connected to the respective output shafts of the first differential gear mechanism and the second differential gear mechanism.

9. A vehicle steering apparatus according to claim 8, wherein
- the rotational motion of the output shaft of the first differential gear mechanism is converted into a linear motion by a first motion converting mechanism to be outputted to one of the sheeting wheels, and
- the rotational motion of the output shaft of the second differential gear mechanism is converted into a linear motion by a second motion converting mechanism to be outputted to the other one of the steering wheels.

10. A vehicle steering apparatus according to claim 7, wherein
- the first differential gear mechanism and the second differential gear mechanism respectively include an electric actuator for outputting the rotation angle of the input shaft to the output shaft as increased or decreased, and
- the vehicle steering apparatus further includes control means for drive-controlling the electric actuator.

* * * * *